United States Patent
Kao et al.

(10) Patent No.: US 10,473,981 B2
(45) Date of Patent: Nov. 12, 2019

(54) DISPLAY DEVICE INCLUDING A RETARDATION LAYER

(71) Applicant: AU OPTRONICS CORPORATION, Hsin-chu (TW)

(72) Inventors: Wang-Shuo Kao, Hsin-chu (TW); Wen-Fang Sung, Hsin-chu (TW); Zhi-Lu Ye, Hsin-chu (TW); Yun Cheng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 234 days.

(21) Appl. No.: 15/652,907

(22) Filed: Jul. 18, 2017

(65) Prior Publication Data

US 2018/0113348 A1 Apr. 26, 2018

(30) Foreign Application Priority Data

Oct. 21, 2016 (TW) .............................. 105134145 A (51) Int. Cl.
*G09G 5/02* (2006.01)
*G02F 1/13363* (2006.01)
(Continued)

(52) U.S. Cl.
CPC ....... *G02F 1/13363* (2013.01); *G02B 6/0056* (2013.01); *G02F 1/13362* (2013.01);
(Continued)

(58) Field of Classification Search
None
See application file for complete search history.

(56) References Cited

U.S. PATENT DOCUMENTS 5,497,256 A * 3/1996 Aoyama ............. G02F 1/13363
349/117
2008/0273149 A1 11/2008 Jeng et al.
(Continued)

FOREIGN PATENT DOCUMENTS

| CN | 202677786 U | 1/2013 |
|---|---|---|
| CN | 105259708 A | 1/2016 |
| TW | 200844602 A | 11/2008 |

OTHER PUBLICATIONS

Office Action issued by the State Intellectual Property Office of the Peoples Republic of China dated Dec. 18, 2018 for Application No. CN201611092243.8.
(Continued)

*Primary Examiner* — Lunyi Lao
*Assistant Examiner* — Kirk W Hermann
(74) *Attorney, Agent, or Firm* — Tim Tingkang Xia, Esq.; Locke Lord LLP (57) ABSTRACT

A display device includes a backlight module, a liquid crystal layer, a lower polarizer, an upper polarizer, and a retardation layer. The liquid crystal layer is disposed on a lighting side of the backlight module while the lower polarizer is disposed between the liquid crystal layer and the backlight module. The upper polarizer is disposed on a side of the liquid crystal layer opposite to the lower polarizer, and the retardation layer is between the upper and lower polarizers. The retardation layer has a retardation area that may modulates the light passing through the lower polarizer and make the light passes through the upper polarizer.

14 Claims, 8 Drawing Sheets

(51) Int. Cl.
*F21V 8/00* (2006.01)
*G02F 1/1335* (2006.01)
*G09G 3/36* (2006.01)

(52) U.S. Cl.
CPC ..... *G02F 1/133528* (2013.01); *G09G 3/3607* (2013.01); *G02F 2001/133531* (2013.01); *G02F 2001/133618* (2013.01); *G02F 2001/133638* (2013.01); *G02F 2203/64* (2013.01); *G02F 2203/66* (2013.01); *G02F 2413/01* (2013.01); *G02F 2413/05* (2013.01)

(56) References Cited

U.S. PATENT DOCUMENTS

| | | | |
|---|---|---|---|
| 2010/0007593 A1* | 1/2010 | Mori | G02F 1/133555 345/94 |
| 2014/0218412 A1 | 8/2014 | Hwangbo et al. | |
| 2017/0146849 A1* | 5/2017 | Tang | G02B 6/0023 |

OTHER PUBLICATIONS

Office Action issued by (TIPO) Intellectual Property Office, Ministry of Economic Affairs, R. O. C. dated Jan. 25, 2017 for Application No. 105134145, Taiwan.

* cited by examiner

DISPLAY DEVICE INCLUDING A RETARDATION LAYER

CROSS-REFERENCE TO RELATED PATENT APPLICATION

This application claims the benefit of priority to Taiwan Patent Application No. 105134145, filed Oct. 21, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a display device. Specifically, the present invention relates to a display device that can still display a particular pattern on a display surface when no voltage is applied to a liquid crystal layer.

BACKGROUND

The background description provided herein is for the purpose of generally presenting the context of the present disclosure. Work of the presently named inventors, to the extent it is described in this background section, as well as aspects of the description that may not otherwise qualify as prior art at the time of filing, are neither expressly nor impliedly admitted as prior art against the present disclosure.

With respect to a design tendency, product appearance designs of consumer electronic and household appliance products nowadays all proceed in a direction of being smaller and lighter. However, on a product including a display device, the area of a display surface of the display device is required to be as large as possible. To compromise between the two opposite design conceptions, designers generally need to reduce the width of a frame of the display device, to increase the area of the display surface by reducing or without increasing the product size.

Figure 1:
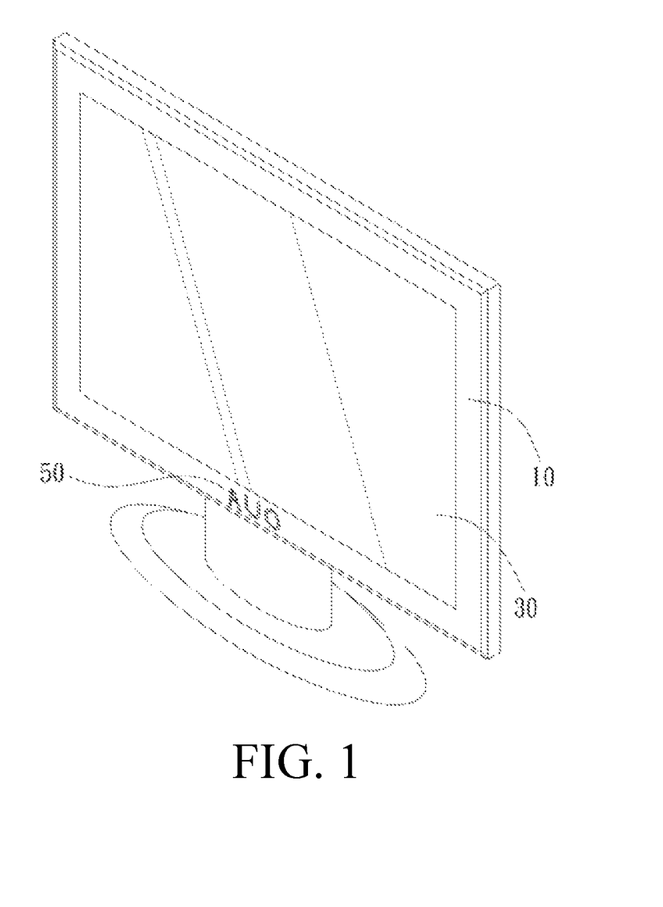
FIG. 1 is a schematic diagram of a conventional display.

FIG. 1 shows a conventional flat panel display, having a front frame 10 and a display panel 30. The front frame 10 covers edges of a display surface on the display panel 30, to achieve effects of protection, structural support, or appearance decoration. In addition, a brand logo 50 is generally disposed on a lower edge of the front frame 10 by means of printing, embedding, or other manners. With the brand logo 50 disposed, consumers can recognize a manufacturer or a supplier of the product.

However, as described above, in the product design tendency nowadays, the width of the front frame 30 is continuously reduced, and even some frameless products emerge. In this case, the width of the front frame 30 is not sufficient to dispose the brand logo 50. In addition, besides the brand logo 50, some other texts or patterns that previously may be indicated on the front frame 30, such as a model and a specification, all have difficulties in indication.

SUMMARY

One objective of the present invention is to provide a display device, to display a particular text or pattern in a shutdown or standby state.

Another objective of the present invention is to provide a display device, to display a particular text or pattern when no voltage is applied to a liquid crystal layer.

The display device includes a backlight module, a liquid crystal layer, a lower polarizer, an upper polarizer, and a retardation layer. The liquid crystal layer is disposed on the lighting side of the backlight module, and the lower polarizer is disposed on a side of the liquid crystal layer that faces the backlight module; in other words, the lower polarizer is disposed between the liquid crystal layer and the backlight module. The upper polarizer is disposed on a side of the liquid crystal layer opposite to the lower polarizer, and the retardation layer is disposed between the lower polarizer and the upper polarizer. The retardation layer includes a retardation area and a non-retardation area, where the retardation area is an area that actually has a phase modulation effect; that is, when light rays pass through the area, phase retardation or lead occurs.

Backlight generated by the backlight module or ambient light passes through the lower polarizer and is polarized by the lower polarizer, and then reaches the retardation layer through the liquid crystal layer. Some light rays falling within the retardation area undergo phase retardation or lead by the retardation area and reach the upper polarizer. When no voltage is applied to the liquid crystal layer, for example, in a shutdown, standby, or sleep state, light rays that have undergone the phase retardation or lead by the retardation area can at least partially pass through the upper polarizer, to achieve an effect of outward display.

These and other aspects of the present disclosure will become apparent from the following description of the preferred embodiment taken in conjunction with the following drawings, although variations and modifications therein may be effected without departing from the spirit and scope of the novel concepts of the present disclosure.

BRIEF DESCRIPTION OF THE DRAWINGS

The accompanying drawings illustrate one or more embodiments of the present disclosure and together with the written description, serve to explain the principles of the present disclosure. Wherever possible, the same reference numbers are used throughout the drawings to refer to the same or like elements of an embodiment, and wherein.

DETAILED DESCRIPTION

The present disclosure will now be described more fully hereinafter with reference to the accompanying drawings, in which exemplary embodiments of the invention are shown. This present application may, however, be embodied in many different forms and should not be construed as limited to the embodiments set forth herein. Rather, these embodiments are provided so that the present disclosure will be thorough and complete, and will fully convey the scope of the invention to those skilled in the art. Like reference numerals refer to like elements throughout.

The present invention provides a display device, and preferably includes a liquid crystal display device. The display device may be a separate computer display, a television, a monitor, or an automobile display; or may be a display module included in another device, for example, a display screen of a mobile phone, a digital camera, or a palmtop game player.

Figure 2:
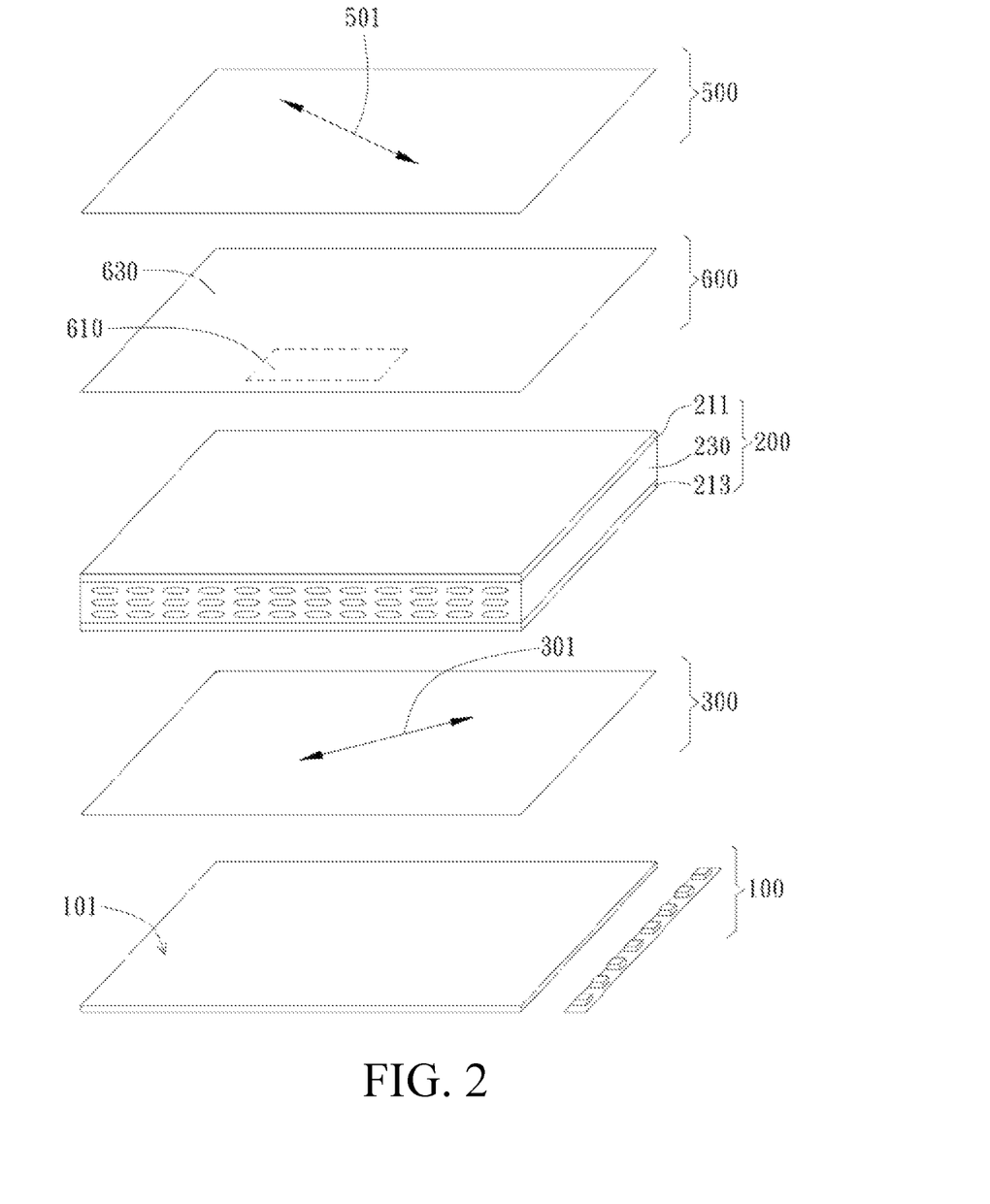
FIG. 2 is an explosive view of elements of an embodiment of a display device according to the present invention.

FIG. 2 shows an embodiment of the display device according to the present invention. As shown in FIG. 2, the display device includes a backlight module 100, a liquid crystal layer 200, a lower polarizer 300, an upper polarizer 500, and a retardation layer 600. In this embodiment, the backlight module 100 uses a direct type light source design, and uses a light emitting diode as a light source. However, in different embodiments, the backlight module 100 may use an edge type light source design, and use a light guide plate to distribute light rays evenly. The backlight module 100 has a lighting side 101; in this embodiment, the lighting side 101 is a side from which generated backlight is output.

The liquid crystal layer 200 is disposed on the lighting side 101 of the backlight module 100, and preferably includes an upper substrate 211, a lower substrate 213, and liquid crystal molecules 230. In this embodiment, the liquid crystal molecules 230 in the liquid crystal layer 200 are arranged in a multi-domain vertical alignment (MVA) manner. However, in different embodiments, another manner such as vertical alignment (VA) or in-plane switching (IPS) may be used. In addition, the liquid crystal layer 200 is preferably disposed between a control circuit substrate (for example, a thin-film transistor circuit substrate) and a color filterer substrate, but the present invention is not limited thereto.

The lower polarizer 300 is disposed on a side of the liquid crystal layer 200 that faces the backlight module 100; in other words, the lower polarizer 300 is disposed between the liquid crystal layer 200 and the backlight module 100. In a preferred embodiment, the lower polarizer 300 may be attached onto an outer side of the lower substrate 213, but the present invention is not limited thereto. The upper polarizer 500 is disposed on a side of the liquid crystal layer 200 opposite to the lower polarizer 300. In a preferred embodiment, the upper polarizer 500 may be attached onto an outer side of the upper substrate 211, but the present invention is not limited thereto. In addition, the lower polarizer 300 has a first light absorption axis 301, and the upper polarizer 500 has a second light absorption axis 501. In this embodiment, the first light absorption axis 301 is preferably perpendicular to the second light absorption axis 501.

The retardation layer 600 is disposed between the lower polarizer 300 and the upper polarizer 500. In the embodiment shown in FIG. 2, the retardation layer 600 is disposed on an inner side of the upper polarizer 500, that is, between the upper polarizer 500 and the liquid crystal layer 200. However, in different embodiments, the retardation layer 600 may be disposed on an inner side of the lower polarizer 300, that is, between the lower polarizer 300 and the liquid crystal layer 200. The retardation layer preferably includes an optical element having a birefringence property. When light passes through the element, a speed of light whose electric field vibrates along a fast axis is fast, while a speed of light whose electric field vibrates along a slow axis perpendicular to the fast axis is slow. Therefore, a phase difference is produced when light in the two directions passes through the retardation layer. If equal to a ¼ wavelength, the phase difference is referred to as a ¼ wave plate. If equal to a ½ wavelength, the phase difference is referred to as a ½ wave plate.

As shown in FIG. 2, the retardation layer 600 includes a retardation area 610 and a non-retardation area 630. The retardation area 610 is an area that actually has a phase modulation effect; that is, when light rays pass through the area, phase retardation or lead occurs. The non-retardation area 630 is an area that does not have a phase retardation effect; therefore, when light rays pass through the area, phase retardation does not occur. In this embodiment, a particular pattern, for example, a brand pattern or another indicative pattern, may be formed in the retardation area 610. However, in different embodiments, a rectangle or another common geometrical shape may be formed in the retardation area 610. As shown in FIG. 2, the retardation area 610 overlaps a partial projection of the liquid crystal layer 200; in other words, in a direction perpendicular to the liquid crystal layer 200, a projection area of the retardation area 610 overlaps the liquid crystal layer 200. Because in this embodiment, the liquid crystal molecules 230 in the liquid crystal layer 200 use the MVA, the retardation area 610 preferably has a phase retardation effect of a ½ wave plate. However, in different embodiments, if the liquid crystal molecules 230 in the liquid crystal layer 200 use the IPS, the retardation area 610 preferably has a phase retardation effect of a ¼ wave plate.

Figure 3:
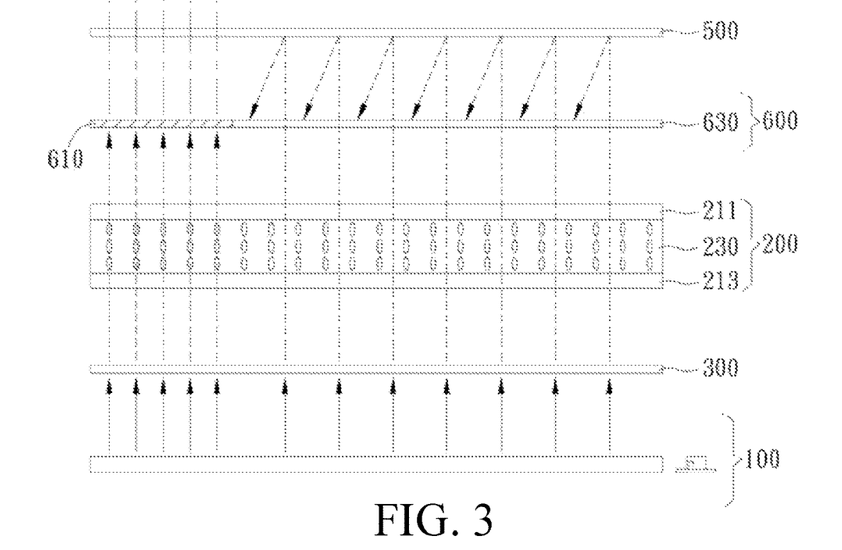
FIG. 3 is a schematic diagram of a side surface of an embodiment of the display device.

As shown in FIG. 3, backlight generated by the backlight module 100, ambient light, or reflected light passes through the lower polarizer 300 and is polarized by the lower polarizer 300, and then reaches the retardation layer 600 through the liquid crystal layer 200. Some light rays reaching the retardation layer 600 fall within the retardation area 610, and the other light rays fall within the non-retardation area 630. The light rays falling within the retardation area 610 undergo phase retardation or lead by the retardation area 610 and reach the upper polarizer 500. When no voltage is applied to the liquid crystal layer 200, for example, control is performed by using a control circuit substrate 201 and no voltage is applied to the liquid crystal layer 200, the light rays that have undergone the phase retardation or lead by the retardation area 610 can at least partially pass through the upper polarizer 500, to achieve an effect of outward display.

In addition, in this embodiment, when no voltage is applied to the liquid crystal layer 200, parts of the lower polarizer 300, the liquid crystal layer 200, and the upper polarizer 500 that correspond to the non-retardation area 630 joint form a normally black composition setting. In other words, light rays polarized by the lower polarizer 300 are blocked by the upper polarizer 500 after passing through the liquid crystal layer 200. Because the non-retardation area 630 does not have an effect of phase retardation or lead on light rays that pass through the non-retardation area 630, the light rays are also blocked by the upper polarizer 500 and cannot be output to the outside. To implement the normally black composition setting, the liquid crystal layer may preferably use the MVA, the VA, or another manner described above. In other words, some pixels in the liquid crystal layer 200 that correspond to the non-retardation area 630 may be considered as normally black pixels.

Contrarily, when no voltage is applied to the liquid crystal layer 200, parts of the lower polarizer 300, the liquid crystal layer 200, and the upper polarizer 500 that correspond to the retardation area 610 joint form a normally white composition setting. In other words, light rays polarized by the lower polarizer 300 are blocked by the upper polarizer 500 after passing through the liquid crystal layer 200. Because the retardation area 610 has an effect of phase retardation or lead on light rays that pass through the retardation area 610, the light rays are at least partially not blocked by the upper polarizer 500 and can be output to the outside. In other words, some pixels in the liquid crystal layer 200 that correspond to retardation area 610 may be considered as normally white pixels. A composition setting of the normally white pixels is preferably the same as that of the normally black pixel, and the difference lies only in correspondence to the retardation area 610 or the non-retardation area 630.

Figure 4:
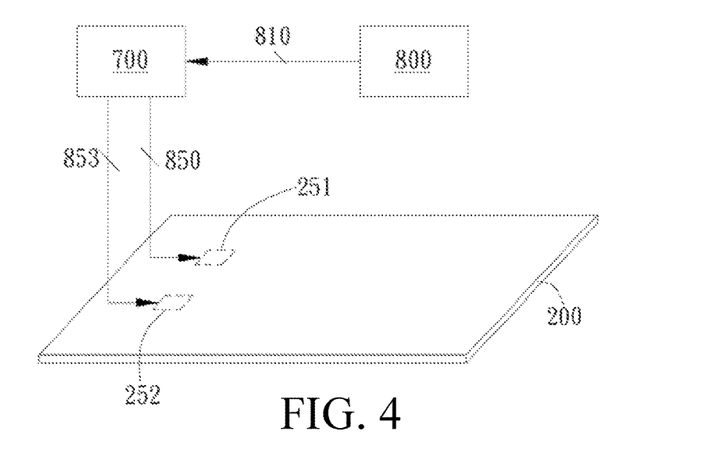
FIG. 4 is a schematic diagram of a signal control embodiment of the display device.

As shown in FIG. 4, light ray control of areas represented by a normally black pixel 251 and a normally white pixel 252 when a voltage is applied to the liquid crystal layer 200 is opposite to that when no voltage is applied to the liquid crystal layer 200. For example, when no voltage is applied, no light rays pass through the area corresponding to the normally black pixel 251, but light rays are allowed to pass through the area corresponding to the normally white pixel 252. Therefore, when image signals are sent to the two areas, corresponding adjustments are required. In this embodiment, the display device further includes an image processing module 700. The image processing module 700 may be preferably a drive circuit or a module in a drive circuit. When receiving an original image signal 810 from a signal source 800, the image processing module 700 performs level inversion processing on a part in the original image signal 810 that corresponds to the normally white pixel 252 to obtain an inversed image signal 853; the other part that does not undergo the level inversion processing forms a non-inversed image signal 850. The inversed image signal 853 is sent to the normally white pixel 252 to control the normally white pixel 252, and the non-inversed image signal 850 is sent to the normally black pixel 251 to control the normally black pixel 251. The level inversion processing may be performed by means of subtraction or another operational method. For example, using a grey scale of 255 as a representative, if a grey scale value in the original image signal 810 that correspond to a normally white pixel 252 is initially 100, after the reversal operation, (255−100=155) is obtained as a corresponding grey scale value in the inversed image signal 853.

Specifically, the retardation area 610 may be formed by means of a photo-mask manufacturing process in collocation with a photo-alignment technology. For example, a liquid crystal polymer may be coated or distributed on a substrate, and a photo-initiator is added. Next, the photo-mask manufacturing process is performed with ultraviolet light irradiating, so that a part of the liquid crystal polymer that is distributed on the retardation area 610 produces alignment and location effects. The other part of the liquid crystal polymer that is distributed on the non-retardation area 630 may be subsequently diffused by heating, so that no alignment property in a particular direction is produced. An example of the method for manufacturing the retardation layer 600 is described above, but the present invention is not limited thereto.

Figure 5:
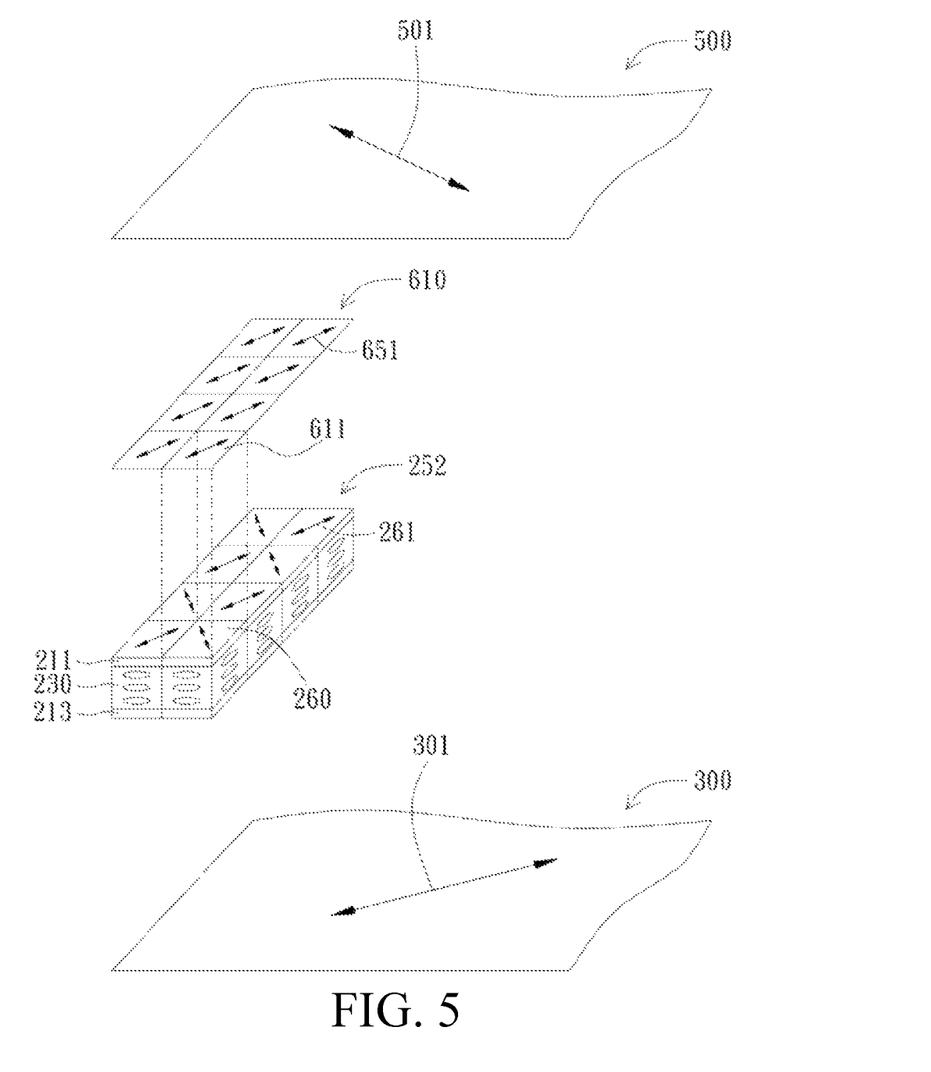
FIG. 5 is a schematic diagram of an embodiment of alignment of a sub retardation area and a sub pixel.

In an embodiment shown in FIG. 5, the retardation area 610 includes a plurality of sub retardation areas 611. Each sub retardation area 611 preferably corresponds to a sub pixel in the liquid crystal layer 200, that is, they are aligned to each other in the direction perpendicular to the liquid crystal layer 200. The sub pixel may refer to different color blocks in a complete pixel, or refer to a quadrant area having different alignment directions in a color block in a pixel. In this embodiment, one normally white pixel 252 may have multiple sub pixels 260, and adjacent sub pixels 260 in a same normally white pixel 252 may have liquid crystal alignment directions 261 that are the same or perpendicular. The liquid crystal alignment direction of the sub pixel 260 herein preferably refers to an arrangement direction in which an alignment layer included in the upper substrate 211 or the lower substrate 213 in the liquid crystal layer 200 gives anchoring energy to the liquid crystal molecules 230. As shown in FIG. 5, each sub retardation area 611 has a first slow axis 651, and first slow axes 651 of adjacent sub retardation areas 611 corresponding to a same pixel have same directions. There is an angle of 40 degrees to 50 degrees between the first slow axis 651 and the first light absorption axis 301 of the lower polarizer 300 or the second light absorption axis 501 of the upper polarizer 500. Preferably, the first slow axis 651 is perpendicular to the first light absorption axis 301 or the second light absorption axis 501. In addition, there may be an angle of 40 degrees to 50 degrees between the first slow axis 651 and an alignment direction of a corresponding sub pixel 260, or the first slow axis 651 may be parallel to the alignment direction of the sub pixel 260. When the first slow axis 651 is perpendicular to the alignment direction of the corresponding sub pixel 260 or there is an angle of 40 degrees to 50 degrees between them, a ½ wavelength lead or retardation effect can be produced for light rays passing through the sub pixel 260 and the sub retardation area 611.

In this embodiment, because first slow axes 651 of adjacent sub retardation areas 611 in the retardation area 610 have a same direction, it is time-saving and labor-saving to manufacture the retardation layer 600. By means of such a design, with the phase retardation or lead effect, the sub retardation area 611 can block, between the upper polarizer 500 and the lower polarizer 300, light rays that should have been output, or output light rays that should have been blocked. In other words, a normally black pixel setting at a particular position on a display surface may change to a normally white pixel setting, so that light rays are allowed to pass through the position when no voltage is applied to the liquid crystal layer 200.

In addition, rotation control of the liquid crystal molecules may not reach a desired value. For example, when a voltage of 7 V is applied to a pixel, the liquid crystal molecules may rotate to make light rays only approximately a ½ wavelength lead. To reduce color cast caused by addition of the retardation layer 600, in this embodiment, an optical path compensation value of the sub retardation area 611 preferably ranges between $(\lambda/2)-20$ nm and $(\lambda/2)+20$ nm, where $\lambda$ ranges between 450 nm and 650 nm. In other words, the ½ wave plate used herein has a certain tolerable range with respect to an actual wavelength modulation value of each sub retardation area 611, rather than is limited to the accurate ½ wavelength.

Figure 6:
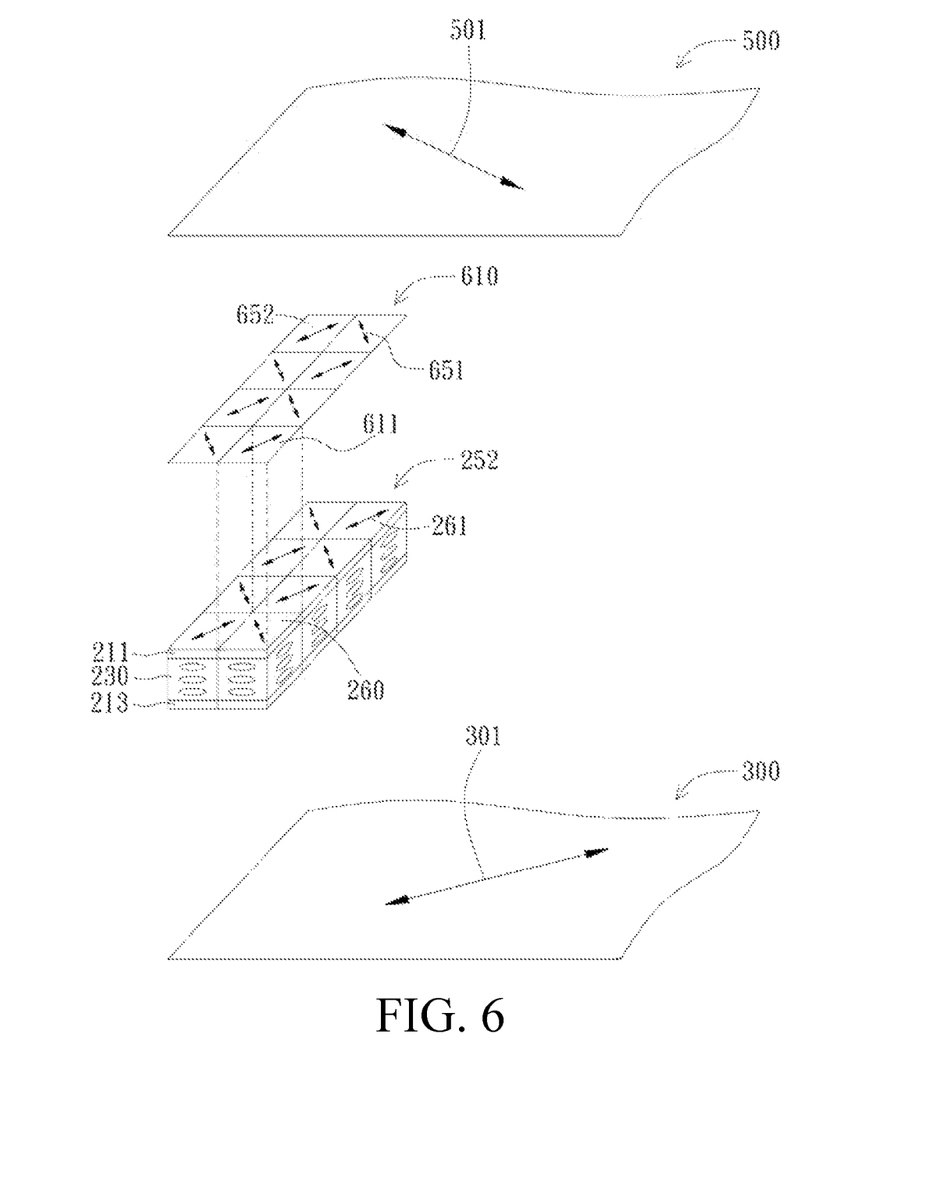
FIG. 6 is a schematic diagram of another embodiment of alignment of a sub retardation area and a sub pixel.

FIG. 6 shows another embodiment of the present invention. In this embodiment, each sub retardation area 611 also corresponds to a sub pixel in the liquid crystal layer 200, that is, they are aligned to each other in the direction perpendicular to the liquid crystal layer 200. In this embodiment, one normally white pixel 252 may have multiple sub pixels 260, and adjacent sub pixels 260 in a same normally white pixel 252 may have mutually perpendicular liquid crystal alignment directions 261. Two adjacent sub retardation areas 611 respectively have a first slow axis 651 and a second slow axis 652 that are orthogonal. Preferably, the first slow axis 651 and the second slow axis 652 are respectively perpendicular to liquid crystal alignment directions of corresponding sub pixels 260, or there are angles of 40 degrees to 50 degrees between them. In addition, the first slow axis 651 is perpendicular to the first light absorption axis 301 of the lower polarizer 300 or the second light absorption axis 501 of the upper polarizer 500, or there is an angle of 40 degrees to 50 degrees between them. When the first slow axis 651 or the second slow axis 652 is perpendicular to the alignment direction of the corresponding sub pixel 260 or there is an angle of 40 degrees to 50 degrees between them, a ½ wavelength retardation effect can be produced for light rays passing through the sub pixel 260 and the sub retardation area 611.

Compared with the previous embodiment, because a slow axis of each sub retardation area 611 is perpendicular to a liquid crystal alignment direction of a corresponding sub pixel 260, each sub retardation area 611 has a ½ wavelength retardation effect on light rays passing through the sub retardation area 611; in other words, a modulation effect of the liquid crystal molecules 230 on the light rays offsets a modulation effect of the sub retardation area 611 on the light rays. Therefore, even though rotation control of the liquid crystal molecules cannot reach a desired value, color cast can still be reduced.

As described above, to reduce color cast caused by addition of the retardation layer 600, in this embodiment, an optical path compensation value of the sub retardation area 611 preferably ranges between $\lambda/2$ nm and $(\lambda/2)+20$ nm, where $\lambda$ ranges between 450 nm and 650 nm. In other words, the ½ wave plate used herein has a certain tolerable range with respect to an actual wavelength modulation value of each sub retardation area 611, rather than is limited to the accurate ½ wavelength.

Figure 7:
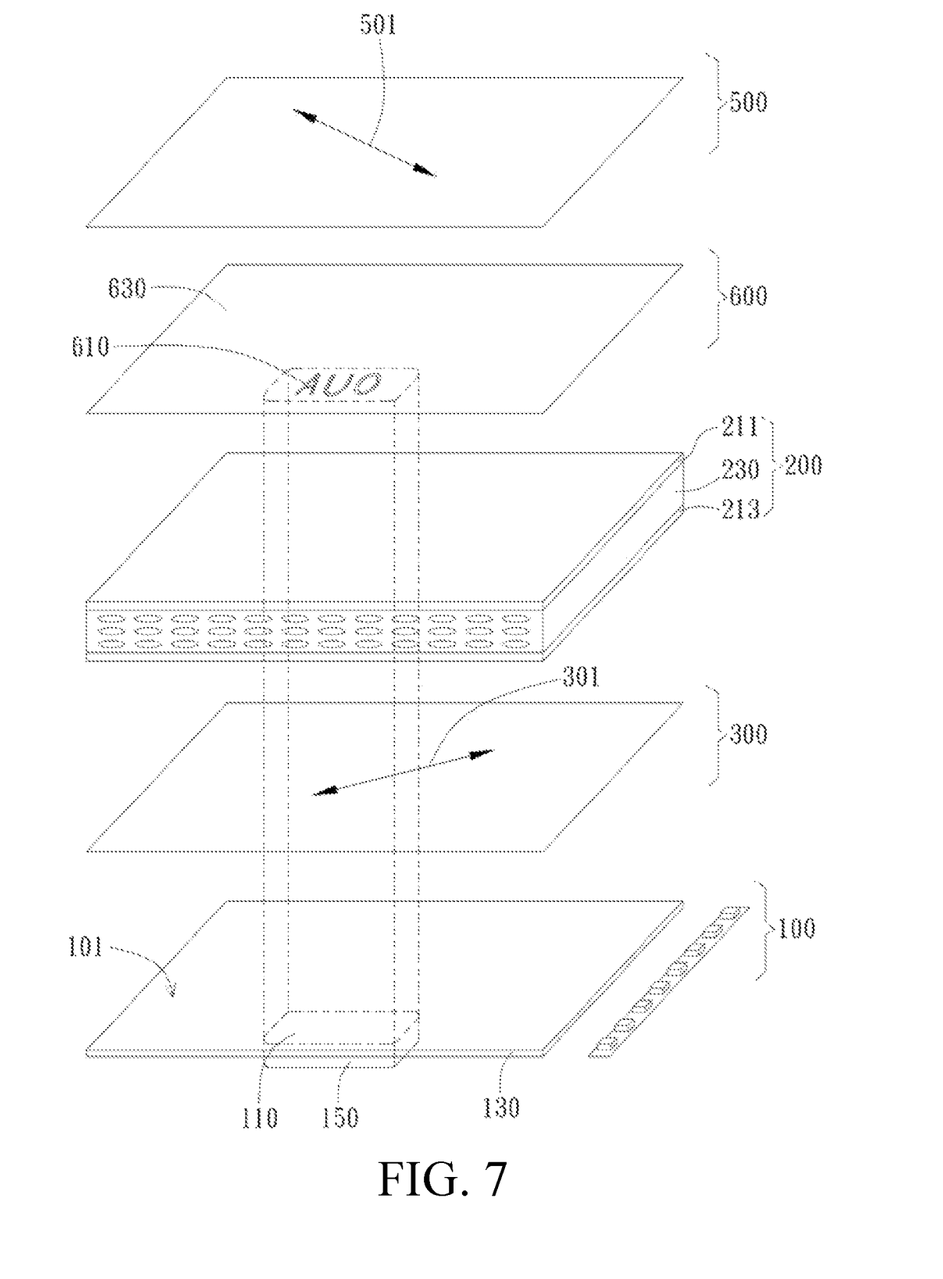
FIG. 7 is a schematic diagram of an embodiment of collocation of a retardation area and a backlight module.

FIG. 7 shows an embodiment of setting the retardation area 610 in the display device according to the present invention. As shown in FIG. 7, a particular pattern AUO is formed in the retardation area 610. The backlight module 100 has a first area 110 corresponding to the position of the retardation area 610. When no voltage is applied to the liquid crystal layer 200, for example, the display device is in a shutdown or sleep state, the first area 110 still generates backlight to cover an entire range of the particular pattern formed in the retardation area 610. In this case, because light rays are allowed to pass through the position corresponding to the retardation area 610 on the display surface, the backlight can be output through the retardation area 610 and the upper polarizer 500, to display the particular pattern AUO.

In this embodiment, the backlight module 100 is of an edge type, and a direct type light source 150 (for example, a light emitting diode) is specially added behind a light guide plate 130 to form the first area 110. However, in different embodiments, the backlight module 100 may directly use a direct type, to form the first area 110 by means of local dimming. In addition, the first area 110 may not be disposed for the backlight module 100 to provide a light source, and a half through half reflected manner may be used, to provide required backlight by using reflected light; or a partially transparent design may be used, to provide required backlight by using ambient light behind.

Figure 8:
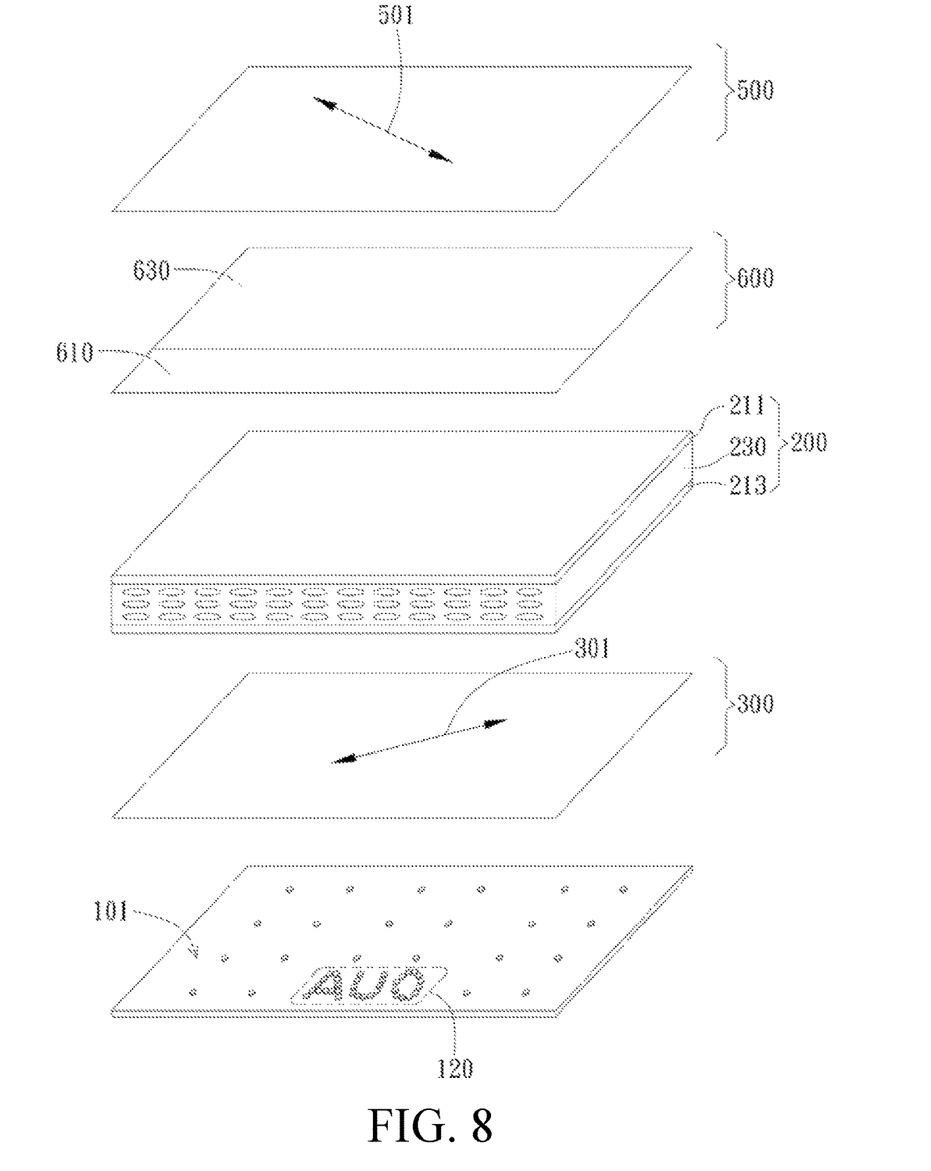
FIG. 8 is a schematic diagram of another embodiment of collocation of a retardation area and a backlight module.

FIG. 8 shows another embodiment of setting the retardation area 610 in the display device according to the present invention. In this embodiment, the retardation area 610 is an elongated area formed close to the bottom of the display surface, and the backlight module 100 has a second area 120 in which a particular pattern AUO is formed and that is opposite to the elongated area formed in the retardation area 610. In a preferred embodiment, the particular pattern of the second area 120 may be formed by arranging light emitting diodes or other light sources. When no voltage is applied to the liquid crystal layer 200, for example, the display device is in a shutdown or sleep state, backlight generated by the second area 120 can be output through the retardation area 610 and the upper polarizer 500, to display the particular pattern AUO.

Figure 9:
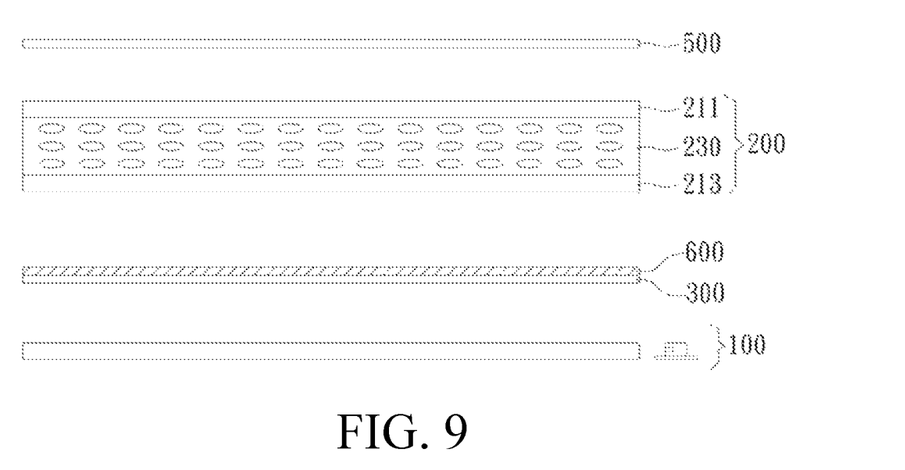
FIG. 9 is a schematic diagram of a side surface of another embodiment of the display device.

In an embodiment shown in FIG. 9, the retardation layer 600 is disposed on a surface of the lower polarizer 300 that faces the liquid crystal layer 200. Same as the foregoing embodiment of disposing the upper polarizer 500, the retardation layer 600 and the lower polarizer 300 may first be manufactured separately, and then attached by using an optical adhesive. Other parts in the display device are basically disposed as described in the foregoing other embodiments, and details are not described herein again.

Figure 10:
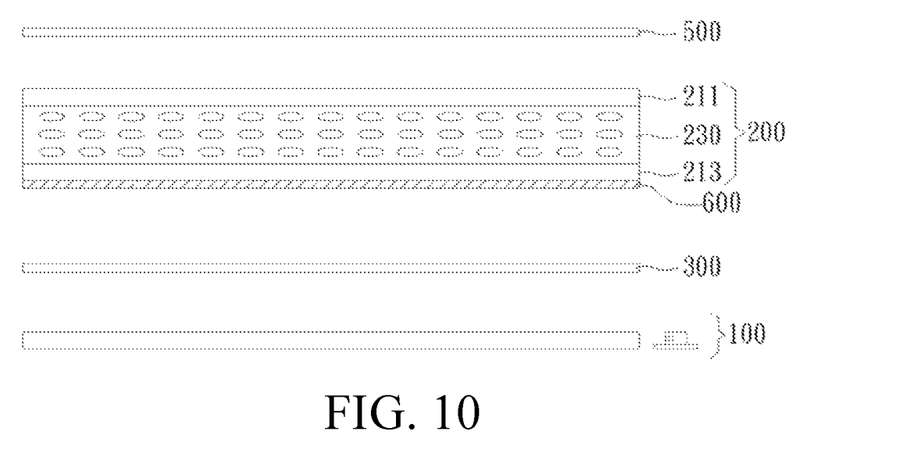
FIG. 10 is a schematic diagram of a side surface of another embodiment of the display device.

In an embodiment shown in FIG. 10, the retardation layer 600 may be formed on the upper substrate 211 or the lower substrate 213 of the liquid crystal layer 200. In this embodiment, the upper substrate 211 or the lower substrate 213 is directly used as a substrate of the retardation layer 600, and then the retardation area 610 and the non-retardation area 630 are formed thereon. In this embodiment, as alignment and attachment are not required, the manufacturing process is simple and convenient. However, in different embodiments, the retardation layer 600 may first be manufactured separately, and then attached onto the upper substrate 211 or the lower substrate 213, and same alignment accuracy can also be achieved.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A display device, comprising:
 a backlight module, having a lighting side;
 a liquid crystal layer, disposed on the lighting side;
 an image processing module to control the liquid crystal layer;
 a lower polarizer, disposed on a first side of the liquid crystal layer that faces the backlight module;
 an upper polarizer, disposed on a second side of the liquid crystal layer opposite to the lower polarizer; and a retardation layer, disposed between the lower polarizer and the upper polarizer, wherein the retardation layer comprises a retardation area and a non-retardation area, and the retardation area overlaps a partial projection of the liquid crystal layer, wherein when no voltage is applied to the liquid crystal layer, backlight generated by a part of the backlight module that corresponds to the retardation area or ambient light passes through the lower polarizer and then undergoes phase retardation or lead by the retardation area and at least partially passes through the upper polarizer, wherein the liquid crystal layer comprises:
   a plurality of normally white pixels, respectively corresponding to the retardation area; and
   a plurality of normally black pixels, respectively corresponding to the non-retardation area, wherein the image processing module receives an original image signal; performs level inversion processing on an image signal part in the original image signal that corresponds to the normally white pixels to obtain an inversed image signal; and respectively controls the normally white pixels and the normally black pixels according to the inversed image signal and a part in the original image signal that is not inversed.

2. The display device according to claim 1, wherein when no voltage is applied to the liquid crystal layer, parts of the lower polarizer, the liquid crystal layer, and the upper polarizer that correspond to the non-retardation area jointly form a normally black composition setting.

3. The display device according to claim 1, wherein the retardation area comprises a ½ wave plate.

4. The display device according to claim 1, wherein the retardation area comprises a plurality of sub retardation areas, each of the sub retardation areas has a first slow axis, and there is an angle of 40 degrees to 50 degrees between the first slow axis and a light absorption axis of the upper polarizer or a light absorption axis of the lower polarizer.

5. The display device according to claim 4, wherein an optical path compensation value of the sub retardation area ranges between $(\lambda/2)-20$ nm and $(\lambda/2)+20$ nm, wherein $\lambda$ ranges between 450 nm and 650 nm.

6. The display device according to claim 4, wherein the light absorption axis of the upper polarizer is orthogonal to the light absorption axis of the lower polarizer.

7. The display device according to claim 1, wherein the retardation area comprises a plurality of sub retardation areas, two adjacent sub retardation areas of the sub retardation areas respectively have a first slow axis and a second slow axis that are orthogonal, and there is an angle of 40 degrees to 50 degrees between the first slow axis and a light absorption axis of the upper polarizer or a light absorption axis of the lower polarizer.

8. The display device according to claim 7, wherein an optical path compensation value of the sub retardation area ranges between $\lambda/2$ nm and $(\lambda/2)-20$ nm, wherein $\lambda$ ranges between 450 nm and 650 nm.

9. The display device according to claim 7, wherein the light absorption axis of the upper polarizer is orthogonal to the light absorption axis of the lower polarizer.

10. The display device according to claim 1, wherein a particular pattern is formed in the retardation area, and the backlight module has a first area; and when no voltage is applied to the liquid crystal layer, backlight generated by the first area of the backlight module covers an entire range of the particular pattern, and is output through the retardation area and the upper polarizer to display the particular pattern.

11. The display device according to claim 1, wherein the backlight module has a second area in which a particular pattern is formed; and when no voltage is applied to the liquid crystal layer, backlight generated by the second area of the backlight module is output through the retardation area and the upper polarizer to display the particular pattern.

12. The display device according to claim 1, wherein the retardation layer is disposed on a surface of the upper polarizer that faces the liquid crystal layer.

13. The display device according to claim 1, wherein the retardation layer is disposed on a surface of the lower polarizer that faces the liquid crystal layer.

14. The display device according to claim 1, wherein the liquid crystal layer comprises:
   a lower substrate;
   a liquid crystal molecule layer, disposed on a side of the lower substrate opposite to the lower polarizer; and
   an upper substrate, disposed on a side of the liquid crystal molecule layer opposite to the lower substrate,
   wherein the retardation layer is disposed on the lower substrate or the upper substrate.

* * * * *